US009102482B2

(12) United States Patent
Levi

(10) Patent No.: US 9,102,482 B2
(45) Date of Patent: Aug. 11, 2015

(54) FOLDING RAMP

(71) Applicant: Avraham Y. Levi, Eagan, MN (US)

(72) Inventor: Avraham Y. Levi, Eagan, MN (US)

(*) Notice: Subject to any disclaimer, the term of this patent is extended or adjusted under 35 U.S.C. 154(b) by 0 days.

(21) Appl. No.: 14/465,271

(22) Filed: Aug. 21, 2014

(65) Prior Publication Data

US 2015/0074925 A1 Mar. 19, 2015

Related U.S. Application Data

(60) Provisional application No. 61/869,324, filed on Aug. 23, 2013.

(51) Int. Cl.
B65G 69/30 (2006.01)

(52) U.S. Cl.
CPC ........................ B65G 69/30 (2013.01)

(58) Field of Classification Search
CPC ... B65G 69/28; B65G 69/2811; E04F 11/002; E04F 11/00; E04F 2011/005; B60P 1/43; B60P 1/435; B66F 7/243; B63B 27/14; B63B 27/143
See application file for complete search history.

(56) References Cited

U.S. PATENT DOCUMENTS

| 2,739,325 | A | * | 3/1956 | Grace, Jr. .................... 14/69.5 |
| 3,635,492 | A | * | 1/1972 | Mauldin .................... 280/43.23 |
| 3,642,156 | A | | 2/1972 | Stenson |
| 3,713,553 | A | | 1/1973 | Curtis et al. |
| 3,802,018 | A | * | 4/1974 | Miles et al. ................ 14/72.5 |
| 4,065,825 | A | * | 1/1978 | Cohen ........................ 14/72.5 |
| 4,075,729 | A | * | 2/1978 | Conner ...................... 14/72.5 |
| 4,864,673 | A | | 9/1989 | Adaway et al. |
| 4,944,546 | A | | 7/1990 | Keller |
| 6,536,064 | B1 | | 3/2003 | Swink et al. |
| 6,986,633 | B2 | | 1/2006 | Kellogg et al. |
| 7,258,384 | B2 | | 8/2007 | Drabik et al. |
| 7,526,826 | B2 | | 5/2009 | Bailie |
| 8,256,053 | B2 | * | 9/2012 | Astor et al. ................ 14/69.5 |
| 8,869,334 | B1 | * | 10/2014 | Leum ........................ 14/72.5 |
| 8,944,743 | B2 | * | 2/2015 | Astor et al. .............. 414/537 |
| 2004/0022613 | A1 | * | 2/2004 | Kellogg et al. ........... 414/537 |
| 2012/0237331 | A1 | * | 9/2012 | Gabrielson ............... 414/800 |

* cited by examiner

Primary Examiner — Abigail A Risic
(74) Attorney, Agent, or Firm — Nikolai & Mesereau, P.A.; Thomas J. Nikolai

(57) ABSTRACT

A ramp assembly for loading and unloading vehicles includes a pair of ramp sections pivotally secured to each other by a hinge assembly and a dolly also secured to the hinge assembly which assists in deploying and stowing the ramp assembly and also in supporting the sections of the ramp assembly as the ramp is used to load and unload a vehicle.

3 Claims, 7 Drawing Sheets

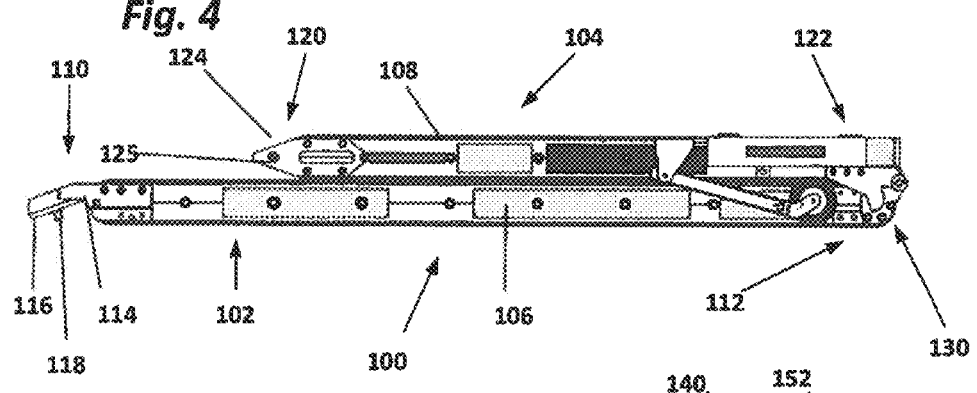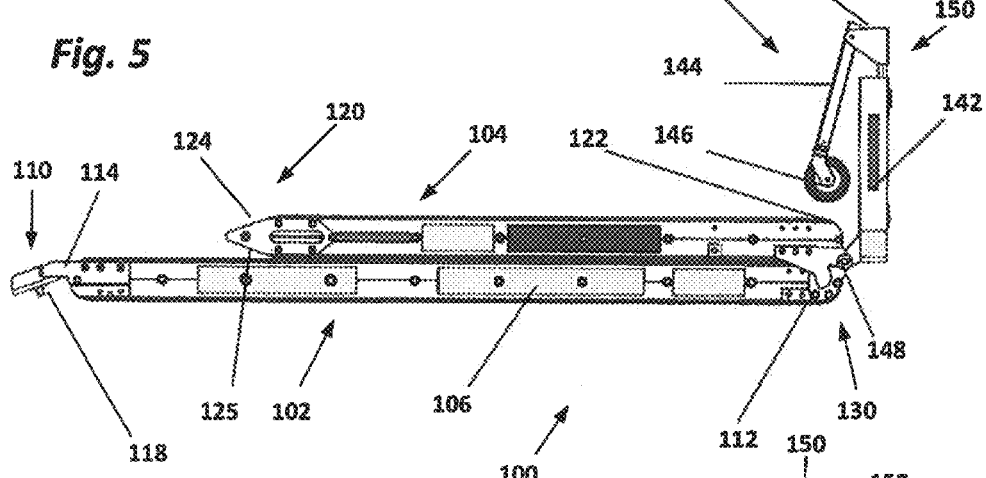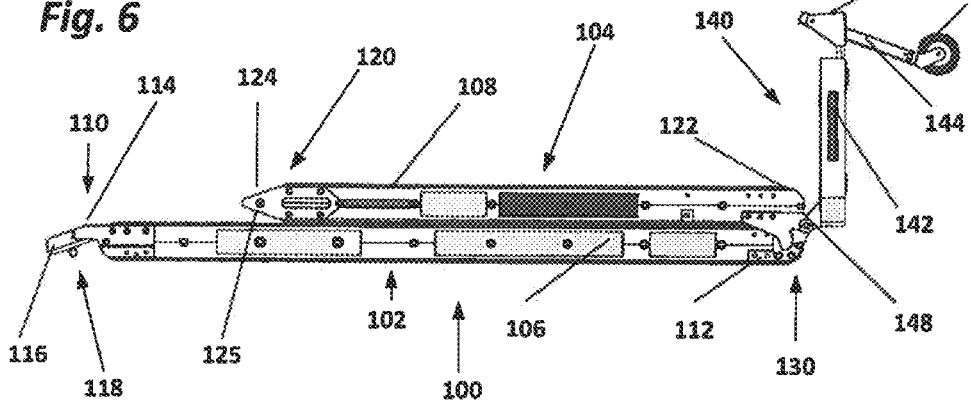

FOLDING RAMP

CROSS-REFERENCED TO RELATED APPLICATIONS

This is a non-provisional application claiming priority to provisional application Ser. No. 61/869,324, filed Aug. 23, 2013.

STATEMENT REGARDING FEDERALLY SPONSORED RESEARCH OR DEVELOPMENT

Not applicable

BACKGROUND OF THE INVENTION

I. Field of the Invention

This invention relates generally to the loading and unloading of trucks and trailers. More particularly, the present invention relates to an improved ramp and deployment mechanism for the ramp used when loading and unloading cargo.

II. Related Art

Various forms of ramps have been employed to assist with the loading and unloading of cargo from vehicles. An example of a prior art ramp is illustrated in FIGS. 1 and 2. As shown in FIG. 2, the ramp 10 is coupled to the floor of a vehicle 12 and extends downwardly and rearwardly from the floor of the vehicle to the ground 14. More specifically, one end of the ramp 16 includes a plate 17 which rests on the floor of the vehicle. The other end of the ramp 18 is tapered to rest on the ground. The ramp illustrated in FIGS. 1 and 2 has a pair of side rails 20 and 22 joined by an interconnecting load bearing surface 24. To make the entire ramp lighter in weight, the load bearing surface 24 is in the the form of a mesh rather than a solid plate. As illustrated in FIG. 2, the load bearing surface is wide enough so that a person can walk up and down the ramp while pushing a two-wheeled dolly carrying cargo.

FIG. 3 shows an assembly which may be used to assist in storing the ramp as the vehicle is being driven and to deploy the ramp for use in loading and unloading cargo from the vehicle. This assembly includes a frame 30 which is typically coupled to the vehicle below the floor. A linkage 32 is also shown. To store the ramp 10 of FIGS. 1-3, the end 18 of the ramp is lifted from the ground and the entire ramp is then slid forward between the floor of the vehicle and the frame 30 so that the ramp 10 is only supported by the frame 30 while the vehicle is being driven.

Ramps such as those shown in FIGS. 1-3 are very popular. However, they are somewhat difficult to deploy, particularly when the ramps are of a longer length, due to the weight of the ramp, the need to lift and lower the back end 18 of the ramp and the need to raise and lower the front end 16 of the ramp between a use position in which the plate 17 resides on the top of the floor of the truck and the stowed position in which the plate 17 (along with the remainder of the ramp) resides between the floor of the truck and the frame 30. Thus, there is a real need for devices which reduce strain on the user's body and the strength required for the user to deploy and stow the ramp.

SUMMARY OF THE INVENTION

The present invention provides an improved ramp for loading and unloading cargo from a vehicle. The improved ramp includes a first ramp section having a first end and a second end. The first end of the first ramp section includes a member for securing the ramp to or at a height proximate to the floor of a cargo vehicle. The second end of the first ramp section is coupled to a hinge arrangement. The ramp also includes a second ramp section having first and second ends. The second end of the second ramp section is also coupled to the hinge such that the second ramp section can be pivoted with respect to the first ramp section between a stowed position in which the first and second ramp sections are in face-to-face registration with each other and a second position in which the first and second ramp sections extend from each other at approximately 180°. The first end of the second ramp section is tapered (as is the first end of the first ramp section) such that when the first end of the first ramp section is positioned adjacent to the floor of a vehicle, the second end of the second ramp section will rest firmly on the ground. The hinge arrangement connecting the first and second ramp sections may be provided with stops which ensure that the two ramp sections will be retained in the extended position approximately 180° from each other as the vehicle is loaded and unloaded.

Additionally, a dolly is secured to the hinge arrangement connecting the first and second ramp sections. The dolly can be rotated between a stored position in which the dolly, too, is in face-to-face registration with the first and second ramp sections when they are in their stowed position. Likewise, the dolly can be rotated about the hinge arrangement into a ground-engaging position to assist with deployment of the ramp and also support the center of the ramp during the loading and unloading process. The dolly includes a first arm coupled to the hinge arrangement at one of its ends and a hinge bracket at its other end. The hinge bracket is, in turn, coupled to an elongate wheel arm which also can pivot between a stowed position, a position in which the wheel engages the ground to assist with sliding the ramp toward and away from the vehicle, and a support position in which the hinge bracket of the dolly engages the ground to further assist in stabilizing the ramp.

The foregoing assembly provides an easy-to-deploy and stow ramp for trucks suitable for use when loading and unloading cargo.

BRIEF DESCRIPTION OF THE DRAWINGS

The foregoing features, objects and advantages of the invention will become apparent to those skilled in the art from the following detailed description and with reference to the following drawings in which like numerals and the several views refer to corresponding parts.

FIG. 4 is a side view showing the ramp of the present invention in its stowed position.

FIG. 5 shows the ramp of FIG. 4 as one begins the process of deploying the ramp for use by rotating the dolly between the stowed position in FIG. 4 to the position shown in FIG. 5.

FIG. 6 is another side view of the ramp of FIG. 4 showing the dolly with the wheel arm extended.

DETAILED DESCRIPTION

Figure 1:
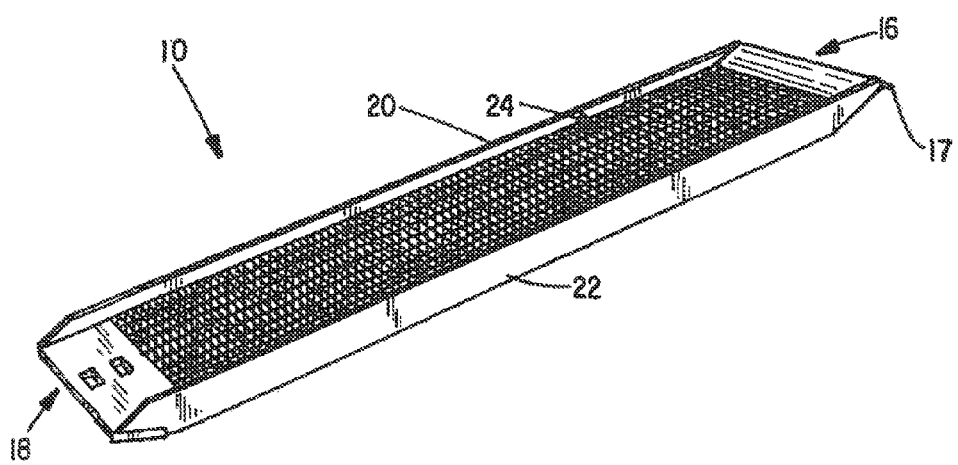
FIG. 1 illustrates a prior art vehicle ramp.
Figure 2:
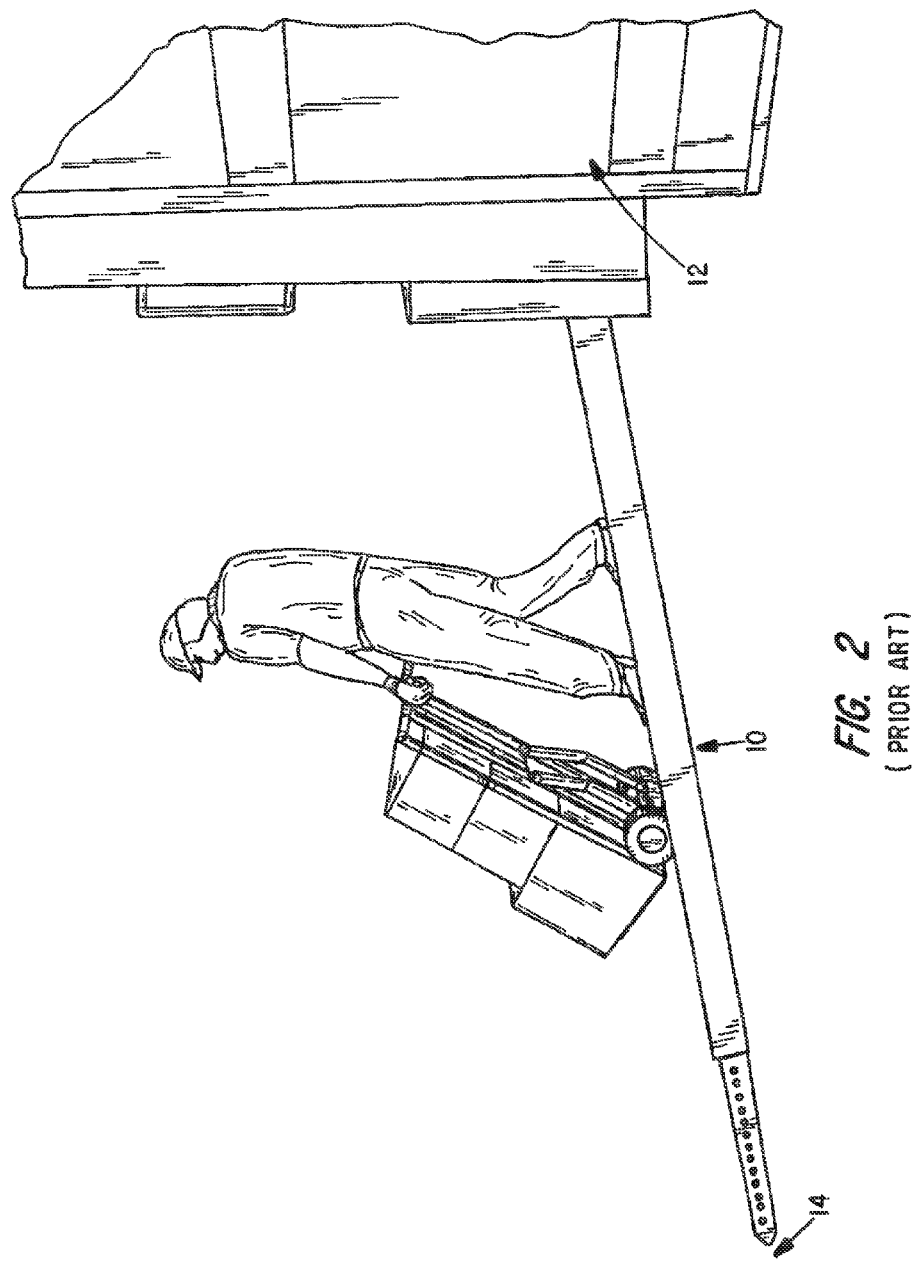
FIG. 2 illustrates the prior art vehicle ramp of FIG. 1 attached to a vehicle and being used to load or unload cargo from the vehicle.

This description of the preferred embodiment is intended to be read in connection with the accompanying drawings, which are to be considered part of the entire written description of this invention. In the description, relative terms such as "lower", "upper", "horizontal", "vertical", "above", "below", "up", "down", "top" and "bottom", as well as derivative thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "joined", and "joining" are used interchangeably and refer to one structure or surface being secured to another structure or surface or integrally fabricated in one piece unless expressly described otherwise.

As illustrated in FIGS. 4-11, the ramp 100 includes a first ramp section 102 and a second ramp section 104. Each ramp section has a pair of side rails similar to the side rails 20 and 22 in FIG. 1. In the drawings, one of the side rails 106 of the first ramp section 102 and one of the side rails 108 of the second ramp second 104 is shown. The opposing side rails are essentially the same as the side rails 106 and 108. Extending between the two side rails of the two ramp sections 102 and 104 is a load bearing surface or platform 109 (FIG. 11) similar to the platform 24 shown in FIG. 1.

The first ramp section 102 has a first end 110 and a second end 112. The first end is tapered at an angle 114 so that the terminal portion 116 of the first end 110 may rest on the floor of a truck or trailer being loaded. A pin 110 may also be provided which enters an orifice in the floor of the truck or otherwise engages the truck to lock the terminal end in place with respect to the floor of the truck. The pin 118 is easily removed when necessary to store the ramp by simply lifting on the first end of the ramp to draw the pin 118 out of the hole so that the terminal end 116 can be removed from the top of the floor of the truck.

The second ramp section 104 also has a first end 120 and a second end 122. The first end 120 includes a first taper 124 which allows the first end 120 of the second ramp section to rest firmly on the ground when the ramp is fully deployed. The first end 120 of the second ramp section 104 includes a second taper 125. The second taper is useful to enable a user of the ramp to easily transition two-wheeled dollies or the like onto the ramp from the ground or off of the ramp to the ground when the ramp is fully deployed in the use position.

The second end 112 of the first ramp section 102 and the second end 122 of the second ramp section 104 are joined together by a pair of hinges, one of which (hinge 130) is shown in the drawings. These hinges connect the rails 106 and 108 of the two ramp portions together so that the ramps can pivot with respect to each other between the position shown in FIG. 4 in which the ramp sections 102 and 104 are in face-to-face registration with each other and the position shown in FIG. 10 in which the two ramp sections 102 and 104 extend from each other at approximately at a 180° angle. The hinges 130 and the ends 122 and 112 of the ramp sections are designed so that the ramp sections will not rotate about hinge 130 beyond about 180°.

The arrangement of the present invention also includes a dolly 140. While the dolly arrangement is visible in FIG. 4, it is more readily seen in the other drawings. Only one side of the dolly is shown. The other side of dolly 140 is coupled to the other side of the second ends of the ramp section and is identical in construction to the side of the dolly shown in the drawings. Thus, both sides of the two ramp sections are supported by the dolly 140 when the dolly 140 is deployed.

As illustrated, each side of the dolly 140 includes a first arm 142, a second arm (which may be referred to as a wheel arm) 144 and a wheel assembly 146 mounted to the end of the wheel arm 144. Substantial mechanical advantage is achieved by providing a wheel arm 144 rather than mounting the wheel assembly 146 directly to the end of first arm 142. The first arm 142 includes a hinge member 148 which is coupled to the hinge assembly 130 so that the entire dolly can be moved from the position shown in FIG. 4 through the position shown in FIGS. 5-8 to the position shown in FIG. 9. Likewise, the dolly can be rotated back about the hinge assembly 130 from the position shown in FIGS. 9 and 10 through the positions shown in FIGS. 5-8 to the position shown in FIG. 4. Stops interacting with the dolly may be provided to prevent over rotation of the dolly beyond the position shown in FIGS. 9 and 10. When the wheel of the wheel assembly 146 engages the ground as in FIG. 8, better weight distribution results than if the wheel were directly beneath the ends 112 and 122 of the ramp sections, making it easier to complete deployment of the ramp assembly or stow the ramp.

The drawings also show that the dolly 140 includes a hinge joining the first arm 142 of the dolly and the wheel arm 144 of the dolly. This permits the wheel arm 144 to be rotated relative to the first arm 142 about the hinge 150 between the position shown in FIGS. 4 and 5 to the position shown, for example, in FIG. 6. It is interesting to note that the hinge 150 includes a surface 152 which engages the ground such that the hinge 150, arm 142 and hinge 130 help support the ends 112 and 122 of the ramp members 102 and 104 in an elevated position above the ground.

More specifically, as the second ramp section 104 is rotated to the deployed position, the wheel of wheel assembly 146 lifts off the ground so that the ends 112 and 122 of the ramp sections are supported above the ground by the arm 142 and surface 152 of the hinge 150. Likewise, as ramp section 104 is returned to its stowed position in face-to-face registration with ramp section 102, the ramp section acts as a lever causing the wheel to engage the ground and the ends 112 and 122 to be lifted by the dolly 140.

Figure 11:
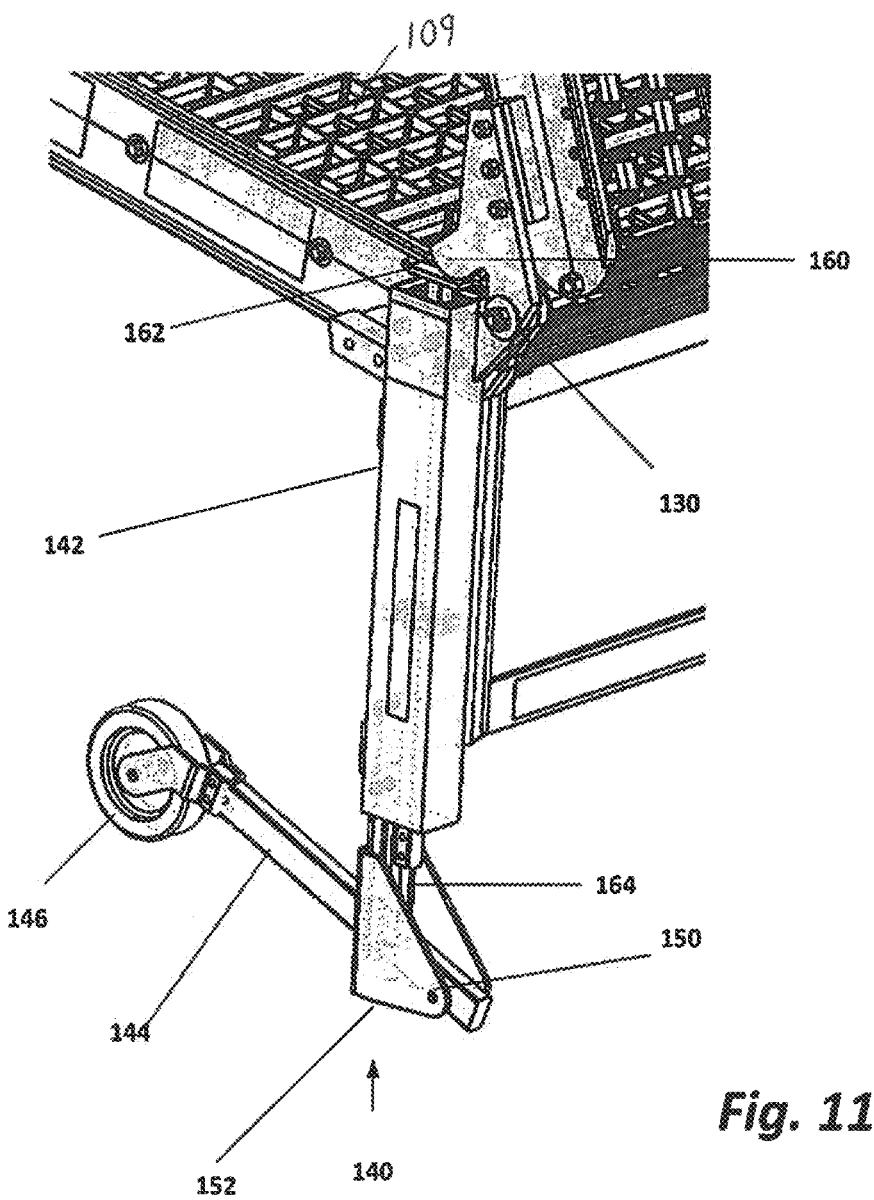
FIG. 11 shows a more detailed view of the dolly of the present invention.

FIG. 11 shows in greater detail the construction of the dolly 140. As shown in FIG. 11, the first arm 142 is hollow and has a plunger bar 164 extending through the central opening of the tubular first arm 142. The lower end of the plunger bar 164 engages the wheel arm 144. The upper end of the plunger bar 164 is attached to a plunger plate 162. The plunger bar 164 and plunger plate 162 collectively comprise a plunger. Joined to the second ramp section 102 near the second end is a plate 160 having a dog-ear cam surface which engages the plunger plate 162 as the second ramp section 104 is rotated from the position shown in FIG. 10 back toward the position shown in FIGS. 4-8. The dog-ear plate 160, plunger plate 162 and plunger bar 164 serve to rotate wheel arm 144 about hinge 150 to raise and lower the wheel assembly 146 between the position shown in FIG. 10 and the position shown in FIG. 8.

Now that the various structures of the ramp have been explained, its operation will be further described.

Figure 3:
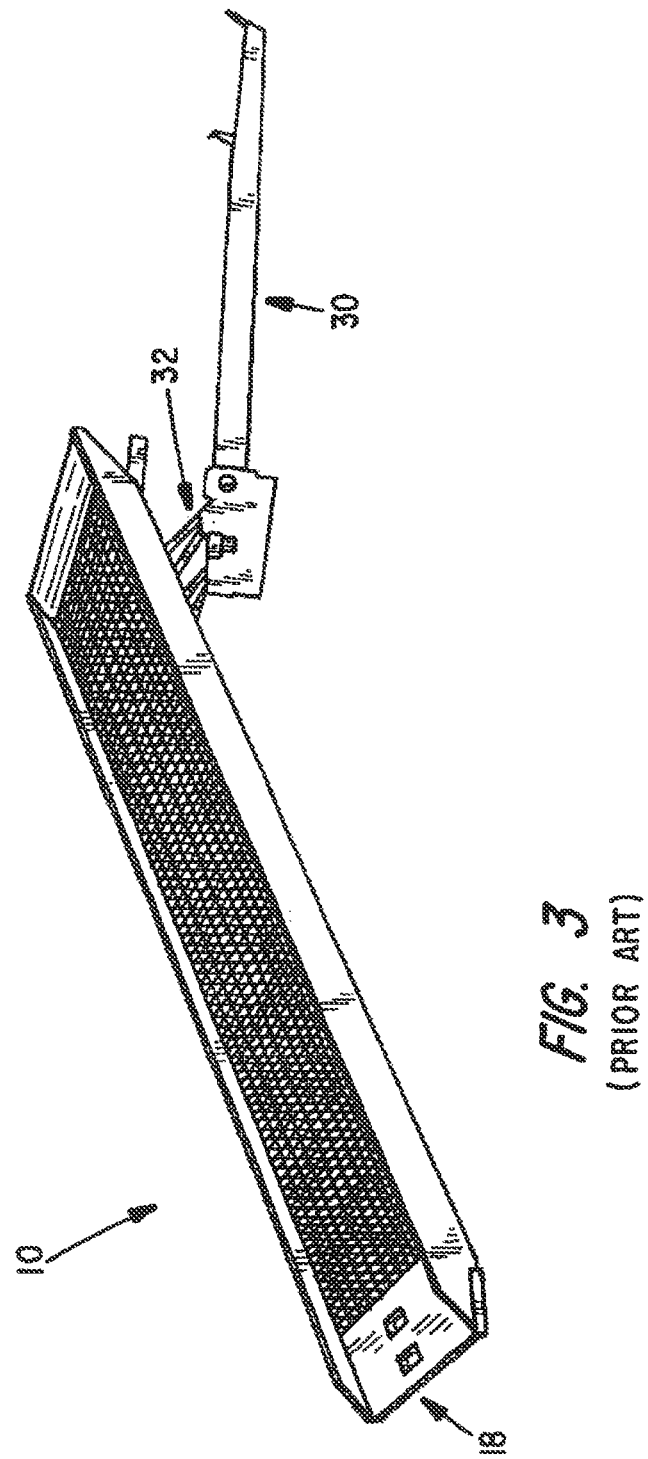
FIG. 3 illustrates the prior art ramp of FIGS. 1 and 2 together with a frame typically coupled beneath the floor of a vehicle and used to stow the ramp below the floor of the vehicle when the ramp is not being used to load or unload cargo.

FIG. 4 shows the ramp in its stowed position. Generally the ramp will be stowed between the floor of a vehicle and a frame such as the frame 30 shown in FIG. 3. Deployment begins by partially retracting the assembly from beneath the vehicle. This is achieved by pulling on the ends 112 and 122 of the ramp members until the dolly 140 clears the back of the vehicle. At this point, the center of gravity is such that the full weight of the ramp is supported by the frame (e.g., frame 30).

Next, the dolly 140 is deployed by rotating the first arm 142 of the dolly from the position shown in FIG. 4 to the position shown in FIG. 5. The wheel arm of the dolly 144 is then rotated about hinge 150 between the position shown in FIG. 5 and the position shown in FIG. 6. The arm 142 can then be further rotated about the hinge arrangement 130 until the dolly reaches the position shown in FIG. 7.

Figure 7:
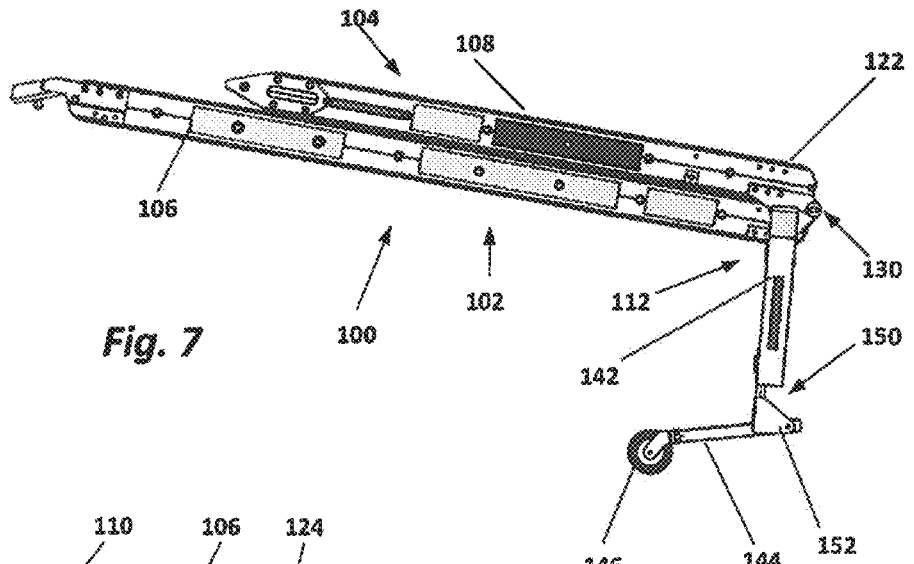
FIG. 7 shows the ramp of FIG. 4 with the wheel of the dolly in its ground-engaging position as the ramp is being elevated from a stowed position to a truck floor-engaging position.
Figure 8:
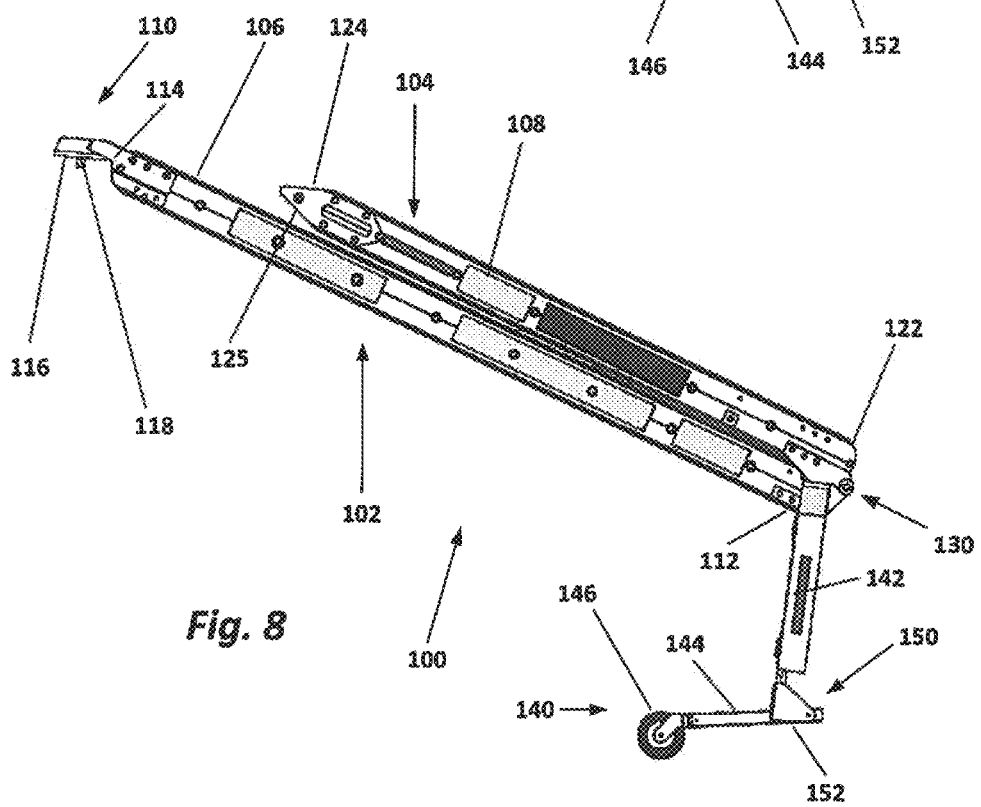
FIG. 8 shows the ramp of FIG. 4 with the first ramp section having reached the floor-engaging height.
Figure 9:
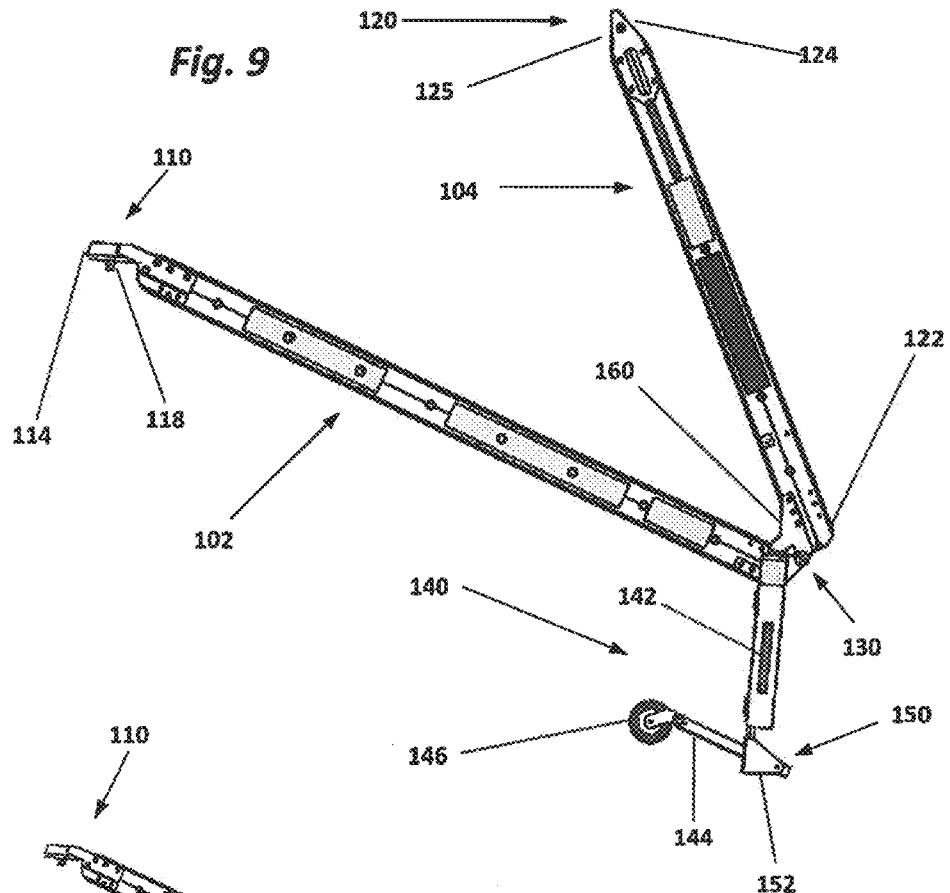
FIG. 9 shows the ramp of FIG. 4 with the second ramp section partially rotated toward its ground-engaging position.
Figure 10:
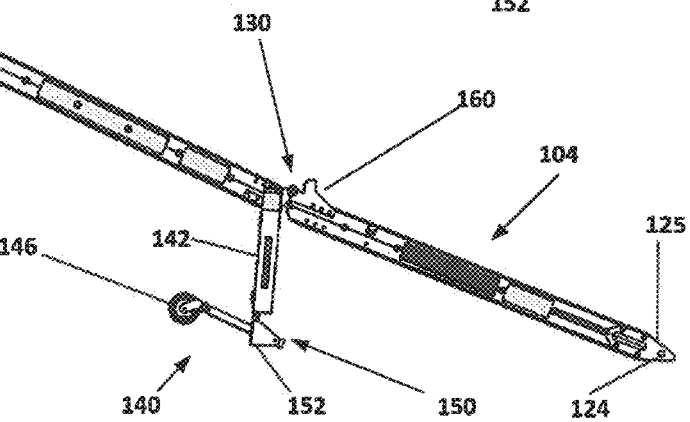
FIG. 10 shows the ramp of FIG. 4 fully deployed for use in loading and unloading vehicles.

More specifically, as the arm 142 is rotated from the position shown in FIG. 6 to the position shown in FIG. 7, the dog-ear on the plate 160 engages the plunger plate 162 forcing the plunger bar 164 downwardly and the wheel arm 144 to rotate about hinge 150 so the wheel of wheel assembly 146 ultimately reaches the position shown in FIG. 7.

Once the position shown in FIG. 7 is reached, the user can pull on the ends 122 and 112 of the ramps sections to further retract the ramp 100 from the storage frame 30 on the underside of the truck's floor. Ultimately, the Wheel of wheel assembly 146 is in engagement with the ground and the rest of the dolly 140 is supported by the wheel above the ground. The length of wheel arm 144 ensures a weight distribution which makes it easy to continue deployment of the ramp assembly. The remainder of ramp 100 can then be more easily retracted from a location beneath the bottom of the floor of the truck because the ramp is supported by the wheels 146. The frame will typically include a catch which may intersect with the pin 118 when the ramp 100 reaches the fully retracted position to prevent the end 110 of ramp member 112 from becoming dislodged and falling to the ground. At this point, the user can lift the end 110 of ramp section 102 up so that the terminal portion 116 of the ramp rests on the floor of the truck. The ramp 100 will then be in the position shown in FIG. 8.

The next step of the deployment process is to begin to rotate frame section 104 about the hinge assembly 130. This is not only necessary to deploy ramp section 104, but also serves to elevate the wheel 146 so that the ground-engaging surface 152 of the dolly is in contact with the ground. More specifically, the pressure applied by the dog-ear cam surface on hinge assembly 130 on the plate 160 is relieved so that gravity lowers the dolly 140 such that surface 152 engages the ground. At this point, the ramp 100 is supported by the floor of the vehicle at end 110 and by the ground-engaging surface 152 of hinge 150 and arm 142 of dolly 140. With the ramp so supported, ramp section 104 can be further rotated about the hinge 130 as suggested by FIG. 9 until it reaches the position shown in FIG. 10 in which the first taper 124 at end 120 of ramp section 104 is also in engagement with the ground. With the ramp in the position shown in FIG. 10, a person can easily push a loaded two-wheeled dolly or the like up or down the ramp as part of a truck loading or unloading process.

Once loading and unloading is complete, the ramp is easily stored. This is achieved by first rotating ramp section 104 about the hinge 130 as suggested by FIG. 9 to the position shown in FIG. 8. As such rotation occurs, the dog-ear cam plate 160 engages the plunger plate 162 and moves the plunger bar 164 causing rotation of wheel arm 144 and wheel assembly 146. Sufficient rotation of ramp section 104, which acts as a lever, causes the wheel of wheel assembly 146 to again engage the ground and the ends 112 and 122 of the ramp sections 102 and 104 to rise. Optimal weight distribution is again provided due to the length of wheel arm 144. The end 110 of the ramp section 102 is then easily removed from the floor of the truck and placed onto the frame 30. At this point, the entire ramp is supported by the frame 30 and the wheels of dolly 140. By pushing on the ends 112 and 122 of the ramp sections, the wheels not only support the ramp, but also allow it to more easily be moved between the truck and the frame. Eventually, the ramp is moved to a point where it is fully supported by the frame. The dolly can then be stowed as illustrated in FIGS. 6 and 5. Once the dolly is in the stowed position shown in FIG. 4, the ramp can then be pushed further onto the frame 30 so it is fully stowed beneath the floor of the vehicle.

From the foregoing, it will be appreciated that although specific examples have been described herein for purposes of illustration, various modifications may be made without deviating from the spirit and scope of this disclosure. For example, the specific structures of the two ramp sections and the frame may be varied without deviating from the invention. It is, therefore, intended that the foregoing detailed description be regarded as illustrative rather than limiting, and that it be understood that it is the following claims, including all equivalents that are intended to identify the invention.

What is claimed is:

1. A ramp assembly comprising:
   a. a first ramp section and a second ramp section joined by first hinges permitting the first ramp section to fold from a retracted position atop the second ramp section to an extended position generally longitudinally aligned with the second ramp section;
   b. a dolly comprising a pair of tubular first arms defining a lumen rotatably coupled at first ends to said first hinges and a pair of wheel arms coupled by second hinges to a second end of the pair of first arms, said dolly being foldable about said first hinges between a first position resting atop the second ramp section to a second position where the pair of wheel arms are adapted to engage a ground surface and support a joint between the first and second ramp segments;
   (c) plunger members extending through said lumens and having a plate on a first end of the plunger, a second end of the plunger engaging the wheel arm; and
   (d) a cam surface fixedly attached to the first ramp section proximate the first hinges and adapted to engage the plate during rotation of the first arms between the first and second positions.

2. The ramp assembly as in claim 1 wherein the first and second ramp sections each comprise a pair of parallel spaced-apart, elongated side rails connected along their length dimension by a load-bearing member.

3. A ramp assembly comprising:
   a. a first ramp section having a first end and a second end;
   b. a second ramp section having a first end and a second end;
   c. a first hinge assembly joining the second end of the first ramp section to the second end of the second ramp section so that the second ramp section may be pivoted between a first position in which the second ramp section is in face-to-face registration with the first ramp section and a second position in which the second ramp section extends from the first ramp section at approximately 180°; and
   d. a dolly comprising a pair of first arms having first and second ends, a pair of wheel arms having first and second ends, a pair of plates having a dog-ear cam surfaces coupled to the second end of the second ramp section and a pair of plungers guided individually by the pair of first arms, the first end of the first arms rotatably coupled to the first hinge assembly, the first end of the pair of wheel arms each coupled to a wheel assembly, the second end of the pair of first arms and the second end of the pair of wheel arms coupled together by second hinges and the plungers each having an end engaging an associated wheel arm, wherein the pair of first arms is rotatable between a first stowed position and a second extended position, the wheel arms are rotatable about an associated second hinge assembly between a first stowed position and a second extended position, and the plungers are adapted to be engaged by the dog-ear cam surfaces to rotate the wheel arms and wheel assemblies.

* * * * *